(12) United States Patent
Li et al.

(10) Patent No.: US 11,648,949 B2
(45) Date of Patent: May 16, 2023

(54) METHOD FOR CONTROLLING A WHEELED VEHICLE IN LOW-GRIP CONDITIONS

(71) Applicants: SAFRAN ELECTRONICS & DEFENSE, Paris (FR); ARMINES—Association Pour La Recherche Et Le Developpement Des Methodes Et Processus Industriels, Paris (FR)

(72) Inventors: Laëtitia Li, Moissy-Cramayel (FR); Brigitte D'Andrea-Novel, Paris (FR); Sylvain Thorel, Moissy-Cramayel (FR); Aurélien Richard, Moissy-Cramayel (FR)

(73) Assignees: SAFRAN ELECTRONICS & DEFENSE, Paris (FR); ARMINES—Association Pour La Recherche Et Le Developpement Des Methodes Et Processus Industriels, Paris (FR)

( * ) Notice: Subject to any disclaimer, the term of this patent is extended or adjusted under 35 U.S.C. 154(b) by 0 days.

(21) Appl. No.: 17/771,264

(22) PCT Filed: Oct. 26, 2020

(86) PCT No.: PCT/EP2020/080078
§ 371 (c)(1),
(2) Date: Apr. 22, 2022

(87) PCT Pub. No.: WO2021/079004
PCT Pub. Date: Apr. 29, 2021

(65) Prior Publication Data
US 2023/0046970 A1 Feb. 16, 2023

(30) Foreign Application Priority Data
Oct. 25, 2019 (FR) ...................... 1912014

(51) Int. Cl.
*B60W 40/00* (2006.01)
*B60W 40/068* (2012.01)
(Continued)

(52) U.S. Cl.
CPC .... *B60W 40/068* (2013.01); *B60W 30/18172* (2013.01); *B60W 50/00* (2013.01);
(Continued)

(58) Field of Classification Search
USPC .................................................. 701/23–100
See application file for complete search history.

(56) References Cited

U.S. PATENT DOCUMENTS 6,128,569 A * 10/2000 Fukushima ......... B60T 8/17551
701/72
9,340,211 B1 * 5/2016 Singh .................... B60T 8/1725
(Continued)

FOREIGN PATENT DOCUMENTS

EP 3028909 A1 6/2016

OTHER PUBLICATIONS

Raymond Ghandour et al.; "Tire/road friction coefficient estimation applied to road safety"; 18th Mediterranean Conference on Control & Automation, Congress Palace Hotel, Marrakech, Morocco; Jun. 23-25, 2010; pp. 1485-1490.
(Continued)

*Primary Examiner* — Jonathan L Sample
(74) *Attorney, Agent, or Firm* — Muncy, Geissler, Olds & Lowe, P.C.

(57) ABSTRACT

A method of controlling a vehicle having wheels provided with tires resting on a surface, the method using a model of the physical behavior of each tire as a function of a sideslip angle ($\beta_{ij}$) for each tire relative to the surface. The model is obtained by implementing an adaptive algorithm that selec-
(Continued)

tively applies an affABREGEine model (Z1), a DUGOFF model (Z2), or a constant model (Z3).

10 Claims, 4 Drawing Sheets

(51) Int. Cl.
 B60W 50/00 (2006.01)
 B60W 30/18 (2012.01)
(52) U.S. Cl.
 CPC . *B60W 2050/0037* (2013.01); *B60W 2520/20* (2013.01); *B60W 2530/20* (2013.01)

(56) References Cited

U.S. PATENT DOCUMENTS

| | | | | |
|---|---|---|---|---|
| 9,821,611 | B2* | 11/2017 | Singh | B60C 23/02 |
| 10,124,809 | B2* | 11/2018 | Thor | B60T 8/17551 |
| 10,576,985 | B2* | 3/2020 | Offenhaeuser | G08G 1/096775 |
| 11,142,210 | B2* | 10/2021 | Kanbayashi | B60C 23/065 |
| 2004/0015284 | A1* | 1/2004 | Suissa | B62D 7/159 |
| | | | | 701/82 |
| 2009/0095064 | A1* | 4/2009 | Imanishi | G01M 17/022 |
| | | | | 73/118.01 |
| 2009/0112435 | A1* | 4/2009 | Meyers | B60W 10/04 |
| | | | | 701/78 |
| 2012/0179349 | A1* | 7/2012 | Yamakado | B60W 30/045 |
| | | | | 701/89 |
| 2012/0185142 | A1* | 7/2012 | Meyers | B60W 10/20 |
| | | | | 701/70 |
| 2017/0320494 | A1* | 11/2017 | Singh | B60W 30/04 |
| 2019/0263399 | A1* | 8/2019 | He | B60W 30/0953 |

OTHER PUBLICATIONS

Andreas Andersson; "Road-Tire Friction Estimation for AFS Vehicle Control"; Master Thesis, Department of Automatic Control, Lund Institute of Technology; Aug. 2006; 51 pages; http://lup.lub.lu.se/student-papers/record/8847828.

Laetitia Li et al.; "New online estimation algorithm of lateral tire-road coefficients based on Inertial Navigation System"; 2019 IEEE Intelligent Transportation Systems Conference—ITSC; Oct. 2019; Auckland, New Zealand; pp. 3859-3866.

\* cited by examiner

METHOD FOR CONTROLLING A WHEELED VEHICLE IN LOW-GRIP CONDITIONS

BACKGROUND OF THE INVENTION

The present invention relates to the field of wheeled vehicles such as land vehicles, and more particularly to off-road vehicles, but also to aircraft while taxiing.

Automatic control methods exist for wheeled vehicles that make use of control relationships relying on a linear model of the behavior of tires relative to the ground. Driving limits are determined by the maximum lateral force exerted by each of the tires on the ground using the formula $F_{ymax}=\mu_{ymax}F_z$ in which $\mu_{ymax}$ is the maximum lateral friction coefficient, which depends on the ground and on the material of the tire, and $F_z$ is the vertical force exerted on the tires corresponding to the weight of the vehicle supported by the tire modulated by the transfer of weight resulting from the vehicle tilting in a sideways direction while turning or while on sloping ground, and in a longitudinal direction while accelerating or decelerating. The friction coefficient varies approximately over the following ranges: 0.9 to 1 for dry asphalt; 0.5 to 0.8 for wet asphalt; 0.2 to 0.3 for snow; and 0.15 to 0.2 for ice.

Those control methods are effective when the vehicle is running on the ground without sliding, as happens with vehicles travelling at a speed that is adapted to the radius of curvature of the path being followed and to the grip of the vehicle tires on the ground. Under such ideal conditions, the sideslip angle β, i.e. the angle between the direction in which the tire is pointing and the travel vector of the tires relative to the ground, is small so that said sideslip angle β is associated with the lateral force $F_y$ that the tire can deliver by a linear relationship until it reaches the maximum force $F_{ymax}$, in compliance with the linear model on which those control relationships rely. Nevertheless, it can be understood that a vehicle can rapidly depart from such ideal conditions, e.g. in the event of a change in the nature of the ground and/or of a modification of its path and/or of a modification of its speed. However, outside such ideal conditions, the behavior of the tire relative to the ground, and thus the variation in the lateral force relative to the sideslip angle β, is not linear.

Present control methods are thus generally unsuitable for driving off-road vehicles or driving at high speeds.

It is not possible to envisage constructing vehicle control relationships on a model that is representative of the non-linear behavior of the tire, such as the PACEJKA model. Specifically, optimum use of that model requires numerous empirical parameters to be defined, which is very difficult to do in real time.

OBJECT OF THE INVENTION

A particular object of the invention is to improve control methods for wheeled vehicles, in particular when the tires present non-linear behavior.

SUMMARY OF THE INVENTION

To this end, according invention, there is provided a method of controlling a vehicle having wheels provided with tires resting on a surface, the method using a model of the physical behavior of each tire as a function of a sideslip angle ($β_{ij}$) for each tire relative to the surface. The model is obtained by defining a theoretical curve for variation of the lateral force ($F_y$) exerted by a tire on the surface as a function of its sideslip angle by identifying in the curve a first zone of linear variation, a second zone of linear-to-nonlinear transition, and a third zone of nonlinear variation; and, for each tire, executing the steps of:

acting in real time to define a group of successive lateral force values ($\hat{F}_{ypij}$), each corresponding to a sideslip angle and determining whether said values are varying in accordance with the first zone, the second zone, or the third zone;

applying an affine model when the values are varying in accordance with the first zone;

applying a DUGOFF model when the values are varying in accordance with the second zone; and applying a constant model when the values are varying in accordance with the third zone.

The model known as the "DUGOFF" model is a model for modelling tires relative to the ground that is effective even though it is relatively simple, since it associates the lateral force ($F_y$) with a limited number of parameters that are specifically the longitudinal stiffness of the tire (written $C_o$), the longitudinal slip ratio (written ox), the cornering stiffness coefficient (written $C_β$), the vertical force ($F_z$), the maximum lateral friction coefficient ($\mu_{ymax}$), and the sideslip angle (f). Also, under conditions of pure lateral slip, the first two parameters can be ignored. Nevertheless, in spite of all that, it has been found that that model is unnecessarily complex over the linear portion of the curve plotting the lateral force as a function of the sideslip angle, and that it converges slowly or on values that are erroneous over the nonlinear portion. In the invention, the DUGOFF model is used to estimate the value of the lateral force over the portion of the curve where it is most effective, while over the other portions of the curve the lateral force is estimated by methods that are more appropriate.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

The invention is described below in application to a vehicle having four steerable wheels.

Figure 2:
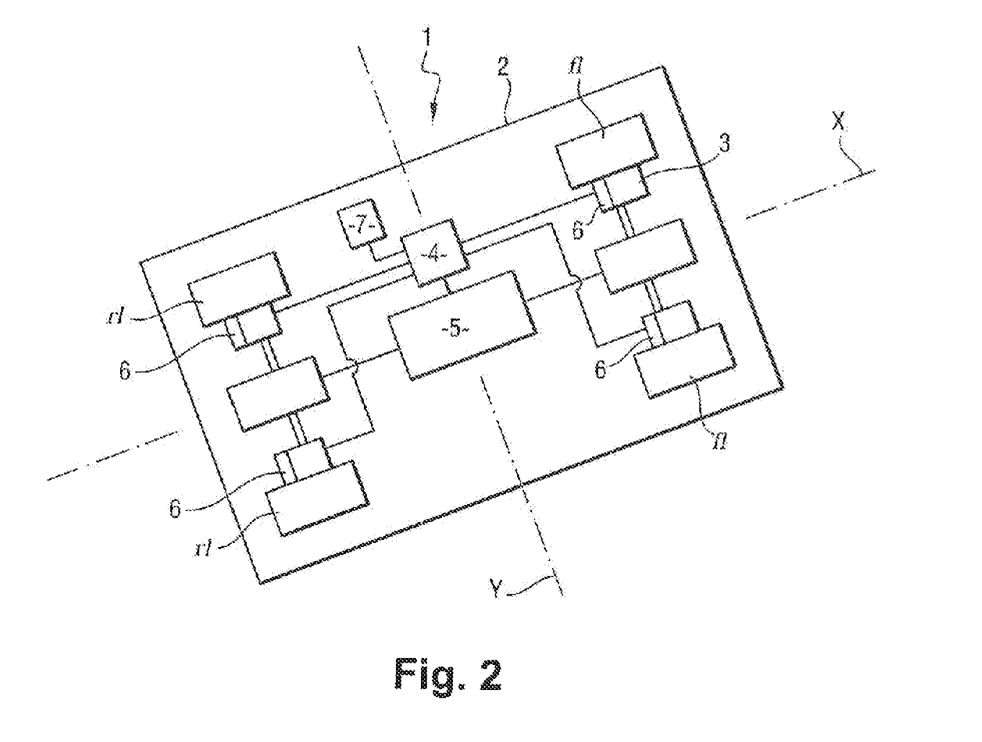
FIG. 2 is a diagrammatic plan view of a wheeled vehicle.

With reference to the figures, the vehicle, given overall reference 1, comprises a body 2 standing on the ground via four steerable wheels, namely: a left front wheel fl, a right front wheel fr, a left rear wheel rl, and a right rear wheel rr. In conventional manner, each wheel comprises a rim surrounded by a tire, and the wheels are steerable relative to the body 2 by motor means 3 connected to an electronic control unit 4 that is also connected to motor means 5 for driving the wheels in rotation and to a braking system 6 for braking rotation of the wheels.

The control unit 4 is also connected to sensors including an inertial measurement unit 7 comprising, in conventional manner, accelerometers and gyros for determining the attitude of the vehicle 1 and the speeds and accelerations to which it is being subjected. The control unit 4 thus receives in particular the speed of the vehicle 1 along its longitudinal axis (x), the speed of the vehicle 1 along its lateral axis (y), and the yaw velocity of the vehicle 1. Other sensors can be envisaged for the application under consideration, and in particular a sensor measuring the speed of rotation of each wheel, a sensor measuring the orientation (or steering angle) of each wheel, a pressure sensor for each tire, a temperature sensor for each tire, . . . . Such sensors and how they are used are known and they are not described in greater detail herein.

The control unit 4 is a computer unit executing a program including instructions for performing the method of the invention. The control method of invention applies at least one control relationship based on an estimate for the cornering stiffness coefficient $C\beta_{ij}$ and for the maximum lateral friction coefficient $\mu_{ymaxij}$ of each of the wheels fl, fr, rl, rr relative to the ground. By using this control relationship, the control unit 4 can control the motor means 3, the motor means 5, and the braking device 6 in order to keep the vehicle 1 on a desired path.

Figure 1:
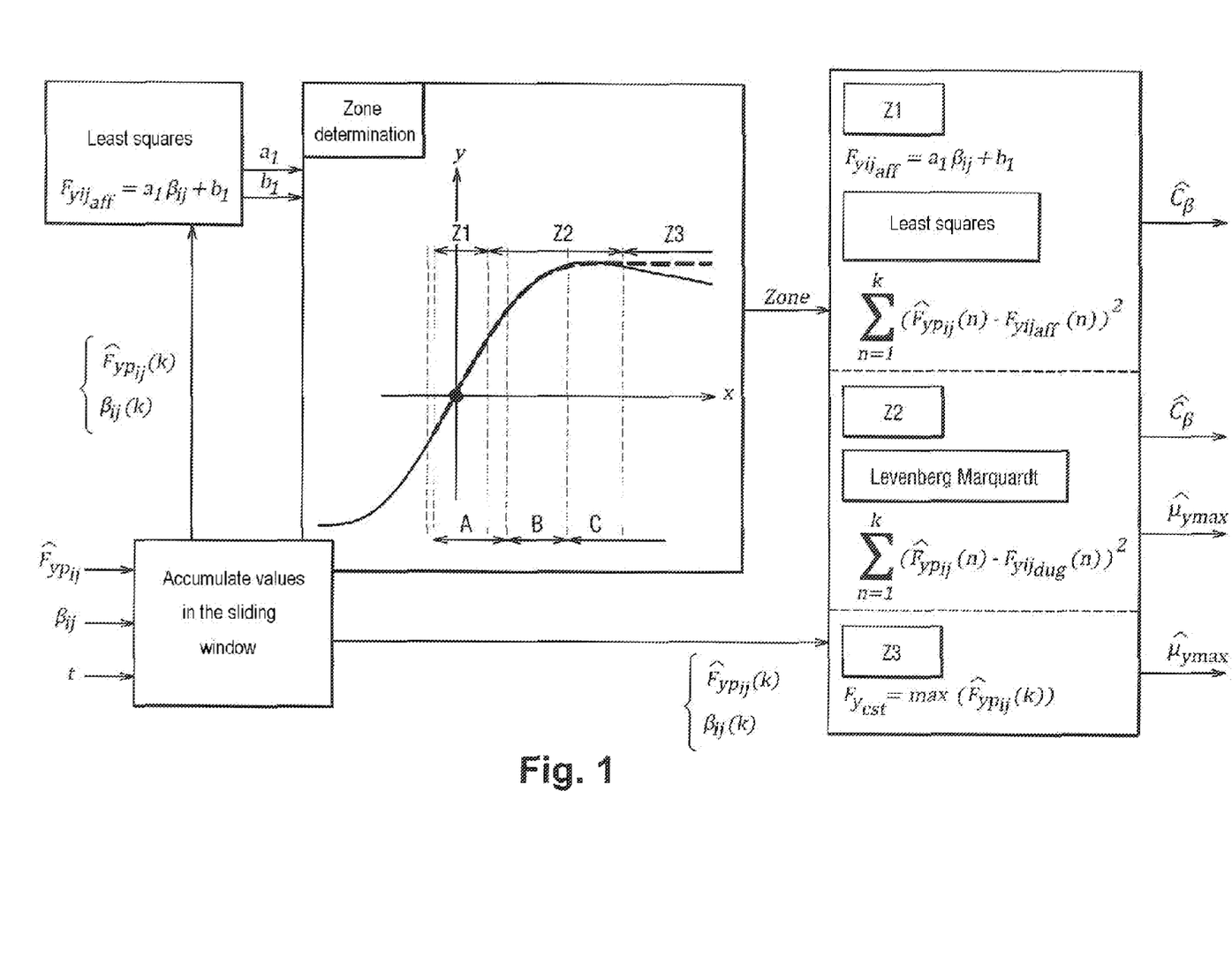
FIG. 1 shows the operation of the algorithm of the invention, and it includes a depiction of how the lateral force varies as a function of the sideslip angle.

The estimates for the cornering stiffness coefficient $C\beta_{ij}$ and for the maximum lateral friction coefficient $\mu_{ymaxij}$ of each wheel are obtained by performing an adaptive algorithm that, for each wheel, executes the steps of:

defining a theoretical curve (FIG. 1) for variation of a lateral force exerted by a tire on the surface as a function of the sideslip angle β by identifying therein a first zone Z1 in which variation is linear, a second zone Z2 of linear-to-nonlinear transition, and a third zone Z3 in which variation is nonlinear;

acting in real time to define a group of successive lateral force values $\hat{F}_{ypij}$ each corresponding to a sideslip angle R and determining whether said values are varying in accordance with the first zone Z1, the second zone Z2, or the third zone Z3;

applying an affine estimation model when the lateral force values lie in the first zone Z1;

applying a DUGOFF model when the lateral force values lie in the second zone Z2; and applying a constant model when the lateral force values lie in the third zone Z3.

The theoretical curve is shown in FIG. 1 to illustrate the operation of the adaptive algorithm of the invention. It can be subdivided into three sections A, B, and C corresponding respectively to linear conditions, to transient conditions, and to nonlinear conditions. The figure also shows the first zone Z1, the second zone Z2, and the third zone Z3, which do not coincide exactly with the three sections.

There follows a more detailed description of how the successive lateral force values $\hat{F}_{ypij}$ are determined.

These values are used as inputs to the models (and they are therefore referred to as "input values") and they are written $\hat{F}_{ypij}$. These input values are determined in real time so as to have available at all times a group of values concerning the period immediately preceding the instant in question.

As input values, it would be possible to use measurements of the lateral force on each tire: nevertheless, it would then be necessary to have recourse to complicated measurement methods requiring large quantities of calculations in order to make the measurements usable. That is why it is preferred to estimate the input values in the manner explained below.

Estimating the lateral force input values requires the sideslip angles and the normal forces to be estimated for each of the wheels.

The sideslip angles for each of the wheels are estimated from the following formulas:

$$\beta_{fl} = \delta_{fl} - \arctan\left(\frac{V_y + l_f \dot{\psi}}{V_x - \frac{e_f}{2}\dot{\psi}}\right)$$

$$\beta_{fr} = \delta_{fr} - \arctan\left(\frac{V_y + l_f \dot{\psi}}{V_x - \frac{e_f}{2}\dot{\psi}}\right)$$

$$\beta_{rl} = \delta_{rl} - \arctan\left(\frac{V_y + l_r \dot{\psi}}{V_x - \frac{e_r}{2}\dot{\psi}}\right)$$

$$\beta_{rr} = \delta_{rr} - \arctan\left(\frac{V_y + l_r \dot{\psi}}{V_x - \frac{e_r}{2}\dot{\psi}}\right)$$

In which:
$l_f$ is the distance between the center of gravity of the vehicle and the front axis;
$l_r$ is the distance between the center of gravity of the vehicle and the rear axis;
$e_f$ is the front track width;
$e_r$ is the rear track width;
$V_x$ is the longitudinal speed of the center of gravity;
$V_y$ is the lateral speed of the center of gravity;
$\dot{\psi}$ is the angular velocity in yaw; and
$\delta_{fl}, \delta_{fr}, \delta_{rl}, \delta_{rr}$ are the steering angles of the wheels.

The various speeds and accelerations are supplied by the inertial unit 7 or they are calculated from the measurements supplied by said inertial unit 7. The steering angles of the wheels are determined by the control relationship from the actions of the driver or they are supplied by dedicated sensors. The other parameters are constant characteristics of the vehicle 1.

The normal forces for each wheel—with weight transfers during stages of acceleration, braking, and tilting of the vehicle being taken into account—are determined as follows:

$$F_{Z_{fl}} = m\frac{l_r}{2l}g - m\frac{h a_x}{2l} - m\frac{h a_y l_r}{e_f l}$$

$$F_{Z_{fr}} = m\frac{l_r}{2l}g - m\frac{h a_x}{2l} + m\frac{h a_y l_r}{e_f l}$$

$$F_{Z_{rl}} = m\frac{l_f}{2l}g + m\frac{h a_x}{2l} - m\frac{h a_y l_f}{e_f l}$$

$$F_{Z_{rr}} = m\frac{l_f}{2l}g - m\frac{h a_x}{2l} - m\frac{h a_y l_f}{e_f l}$$

In which: m is the mass of the vehicle, g is the acceleration due to gravity, h is the height of the center of gravity, $a_x$ is a longitudinal acceleration of the center of gravity, and $a_y$ is a lateral acceleration of the center of gravity. The first parameter is a constant characteristic of the vehicle or it may be measured by a sensor, and the acceleration due to gravity depends on the geographical zone and it can be measured.

It is possible to estimate the longitudinal force $F_{xpij}$ for each tire:

$$F_{xp_{ij}} = \frac{T_{\omega_{ij}} - I_r \dot{\omega}_{ij}}{r_{ij}}$$

Where:
- $T_{\omega ij}$ is the torque of the wheel under consideration;
- $I_r$ is the moment of inertia of the wheel under consideration (and is identical for all of the wheels in the present example);
- $\omega_{ij}$ is the angular velocity of the wheel under consideration; and
- $r_{ij}$ is the effective radius of the tire on the wheel under consideration.

In this example, input values for the lateral force are estimated without having recourse to a model, since a model is already in use for determining the cornering stiffness coefficient $C_{\beta ij}$ and the maximum lateral friction coefficient $\mu_{ymaxij}$. For example, it is possible to use the method described by J. Yang et al., «Estimate Lateral Tire Force Based on Yaw Moment without Using Tire Model», ISRN Mechanical Engineering Volume 2014, Hindawi Publishing Corporation.

The yaw moment $M_G$ at the center of gravity G and the yaw moments $M_{Gij}$ at the centers of gravity $G_{ij}$ of each of the wheels are calculated initially:

$$M_G = I_z \ddot{\psi} = T_{x0} + T_{y0}$$

$$M_{G_{ij}} = M_G + m(\overrightarrow{a_G} \wedge \overrightarrow{GG_{i,j}}) \cdot \overrightarrow{z_G} = T_{x_{ij}} + T_{y_{ij}}$$

In this pair of equations:
- $\overrightarrow{a_G}$ is the acceleration vector at G;
- $\overrightarrow{Z_G}$ is the vertical axis attached to the vehicle;
- $T_x$ includes the terms that depend on the longitudinal forces (as described in the above-mentioned article); and
- $T_x$ includes the terms that depend on the lateral forces (as described in the above-mentioned article).

The subscripts i designate a front wheel (i=f) or a rear wheel (i=r) while the subscripts j designate a left wheel (j=l) or a right wheel (j=r).

By putting the pair of equations in the form of a matrix, the following is obtained:

$$\hat{F}_Y = H^{-1} T_Y$$

With:

$$\begin{cases} T_Y = \left( T_{y0} \frac{(T_{y_{rl}} - T_{y_{fl}}) + (T_{y_{rr}} - T_{y_{fr}})}{2} \right) \\ \hat{F}_Y = (\hat{F}_{ypf} \ \hat{F}_{ypr})^T \\ T_{y\bullet} = M_\bullet - T_{x\bullet} \\ H = \begin{pmatrix} l_f \cos(\delta_f) & -l_r \cos(\delta_r) \\ l_f + l_r \cos(\delta_f) & l_f + l_r \cos(\delta_r) \end{pmatrix} \end{cases}$$

$F_{ypf}$ corresponds to the total lateral force for the front axle and $F_{ypr}$ corresponds to the total lateral force for the rear axle. The symbol •, as in $M_\bullet$, $T_{y\bullet}$, and $T_{x\bullet}$, serves to simplify the expression in order to avoid repeating equations: and in this example it can be replaced by G or by $G_{ij}$ depending on whether it is the center of gravity of the vehicle 1 that is concerned or the center of gravity of each of the wheels. The input values of the lateral forces for each wheel are calculated by distributing the vertical force as follows:

$$\hat{F}_{ypfl} = \frac{F_{zfl}}{F_{zfl} + F_{zfr}} \hat{F}_{ypf} \quad \hat{F}_{ypfr} = \frac{F_{zfr}}{F_{zfl} + F_{zfr}} \hat{F}_{ypf}$$

$$\hat{F}_{yprl} = \frac{F_{zrl}}{F_{zrl} + F_{zrr}} \hat{F}_{ypr} \quad \hat{F}_{yprr} = \frac{F_{zrr}}{F_{zrl} + F_{zrr}} \hat{F}_{ypr}$$

For model selection purposes, the input values are inserted into the algorithm in the form of a sliding window. The sliding window is in fact a group containing the data $\{\hat{F}_{ypij}(k), \beta_{ij}(k), t(k)\}$ with $1 \leq k \leq N$, where N is the empirically determined maximum dimension of the window, and t is time. The window is used to accumulate values over time so as to avoid estimation aberrations, but is also necessary to limit the number of values that are accumulated in order to limit calculation time and load. Use of the window is based on thresholds $\epsilon_1$, $\epsilon_2$, $\tau_1$, and $\tau_2$ in such a manner that:

a value is added to the window if:
- the difference between the most recent sideslip angle $\beta(k)$ of the window and the current sideslip angle $\beta(k+1)$ is greater than a first angle threshold $\epsilon_1$; and/or
- no value has been added for a time longer than a first time threshold $\tau_1$; and the window is refreshed if:
- the difference between the first sideslip angle $\beta(1)$ of the window and the last sideslip angle $\beta(N)$ of the window is greater than a second angle threshold $\epsilon_2$, then the first value is deleted; and/or
- a value has been in the window for a length of time longer than a second time threshold $\tau_2$, then the first value is deleted; and/or
- the window contains a number of data items equal to a predetermined number threshold, then values are deleted, preferably in this example every other value.

Which model to apply is determined by calculating the slope of the curve by applying the values of the group to the affine model, with the transition from one zone to another being determined as a function of the values of the slope and of the intercept. Specifically, the value of the slope is representative of a straight line in the first zone Z1, decreases down to 0 in the second zone Z2, and is small and negative in the third zone Z3.

Application of the models seeks to select the cornering stiffness coefficient $C_{\beta ij}$ and the maximum lateral friction coefficient $\rho_{ymaxij}$ so as to minimize the error between the estimates $F_{yij}^*$ of the lateral force value and the input values.

The affine model is written in the following form:

$$F_{yij}^* = \alpha_1 \beta_{ij} + b_1$$

It can be understood that $a_1$ represents the slope of the curve in the zone Z1 while $b_1$ represents the intercept (i.e. the value of the lateral force for a sideslip angle of zero).

Application of the affine model advantageously includes least squares solving using:

$$\sum_{n=1}^{k} \left( \hat{F}_{yp_{ij}}(n) - F_{yij_{aff}}(n) \right)^2$$

With: $F_{y_{ij_{aff}}} = \alpha_1 \beta_{ij} + b_1$

Application of the affine model serves only to determine the cornering stiffness coefficient $C_{\beta ij}$, which can thus be updated.

The DUGOFF defines the longitudinal force $F_x$ and the lateral force $F_y$ as follows:

$$F_x = C_\sigma \frac{\sigma_x}{1+\sigma_x} f(\lambda)$$

$$F_y = C_\beta \frac{\tan(\beta)}{1+\sigma_x} f(\lambda)$$

The parameter $f(\lambda)$ is given by:

$$f(\lambda) = \begin{cases} (2-\lambda)\lambda & \text{if } \lambda < 1 \\ 1 & \text{if } \lambda \geq 1 \end{cases}$$

$$\lambda = \frac{\mu_{max} F_z (1+\sigma_x)}{2\sqrt{(C_\sigma \sigma_x)^2 + (C_\beta \tan(\beta))^2}}$$

In these formulas:
$\sigma_x$ is the longitudinal slip ratio;
$C_\sigma$ is the longitudinal stiffness;
$C_\beta$ is the cornering stiffness coefficient;
$F_z$ is the normal force; and
$\rho_{max}$ is the maximum ground-tire friction coefficient.

By ignoring longitudinal slip, the simplified DUGOFF model is obtained, which is preferably used in this example:

$$F_{y_{ij} \, dug} = \begin{cases} C_{\beta_{ij}} \tan(\beta_{ij}) & \text{if } \lambda \geq 1 \\ C_{\beta_{ij}} \tan(\beta_{ij})(2-\lambda)\lambda & \text{if } \lambda < 1 \end{cases}$$

With $$\lambda = \frac{\mu_{y_{ij}max} F_{z_{ij}}}{2 C_{\beta_{ij}} |\tan(\beta_{ij})|}$$

The subscripts i specify a front wheel (i=f) or a rear wheel (i=r) while the subscripts j specify a left wheel (j=l) or a right wheel (j=r).

Application of the DUGOFF model includes performing a Levenberg Marquardt optimization algorithm. Let:

$$\sum_{n=1}^{k} \left( \hat{F}_{yp_{ij}}(n) - F_{y_{ij_{dug}}}(n) \right)^2$$

Thus, the cornering stiffness coefficient $C_{\beta ij}$ and the maximum lateral friction coefficient $\mu_{ymaxij}$ of each tire relative to the ground are both used for modelling the characteristics of the interaction between the tire and the ground, and can therefore be updated by applying the model.

This gives rise finally to:

$$F_{y_{ij}}^* = F_{y_{ij} \, dug}$$

Applying the constant model consists in giving a predetermined value to the estimate of the lateral force when the value of the lateral force that is to be estimated lies in the third zone Z3, and is written as follows:

$$F_{y_{ij}}^* = b_2$$

In this equation, $b_2 = F_{y_{est}}$, which corresponds to the maximum lateral force value in the zone Z3, i.e.:

$$F_{y_{est}} = \max(\hat{F}_{yp_{ij}}(k))$$

Only the value of the maximum lateral friction coefficient $\mu_{ymaxij}$ for each tire relative to the ground is determined and updated with this model.

It is advantageous to calculate the sideslip angle $\beta_{th}$ that constitutes the threshold from which the affine model is no longer valid. In theory, in the first zone, the affine model and the DUGOFF model (with $\lambda \geq 1$) ought to coincide. Thus, the ratio p is substantially equal to 1, such that:

$$p = \frac{F_{lin}}{F_{y \, dug \, NL}}$$

$F_{lin}$ corresponds to the lateral force obtained by a linear model such that:

$$F_{lin} = C_{\beta ij} \beta_{ij}$$

$F_{yDugNL}$ corresponds to the lateral force obtained by the DUGOFF model for $\lambda < 1$.

It is considered that the threshold $\beta_{th}$ is reached when p is greater than or equal 1.05 (determined empirically). The following is then obtained:

$$p = \frac{C_{\beta_{ij}} \beta_{ij}}{(2-\lambda)\lambda C_{\beta_{ij}} \tan(\beta_{ij})} \approx \frac{1}{(2-\lambda)\lambda}$$

This equation is solved as follows:

$$\beta_{th_{ij}} = \frac{4 p \mu_{y_{ij}max} F_{z_{ij}} C_{\beta_{ij}} \pm \sqrt{\Delta}}{8 C_{\beta_{ij}}^2}$$

With $$\Delta = 16 \mu_{y_{ij}max}^2 F_{z_{ij}}^2 C_{\beta_{ij}}^2 (P^2 - p), \Delta \geq 0$$

The smaller value is then selected as the threshold, namely:

$$\beta_{th_{ij}} = \frac{4 p \mu_{y_{ij}max} F_{z_{ij}} C_{\beta_{ij}} - \sqrt{\Delta}}{8 C_{\beta_{ij}}^2}$$

In this example, the estimated values of the lateral force are used in a control relationship u for assistance in driving the vehicle. The control relationship $u = (T_\omega, \delta_f, \delta_r)^T$, implemented by the electronic control unit 4 enables said electronic control unit 4 to control the motor means 3, the motor means 4, and/or the braking device 6 in such a manner as to adjust the torque of the wheels and their steering angles in order to keep the vehicle 1 on the desired path.

In practice, the control relationship seeks to reduce the difference between the real position of the vehicle 1, which is associated with a reference frame [c], relative to a position of a reference vehicle ideally placed along the path, which is associated with a reference frame [d]. The vehicle 1 and the reference vehicle and the respective positions $(X, Y, \psi)^T$ and $(X_d, Y_d, \psi_d)^T$ in the same inertial reference frame [i]. $R_{\psi d}$ is the transformation matrix between the reference frames [d] and [i], and $R_{\psi d}$ is the transformation matrix between the reference frames [c] and [i], such that:

$$R_{\psi_\bullet} \triangleq \begin{pmatrix} \cos(\psi_\bullet) & -\sin(\psi_\bullet) & 0 \\ \sin(\psi_\bullet) & \cos(\psi_\bullet) & 0 \\ 0 & 0 & 1 \end{pmatrix}$$

The longitudinal, lateral, and yaw error in following the path is written $e=(e_X, e_Y, e_\psi)^T$ in the reference frame [i] and $x_1$ in the reference frame [c] such that:

$$e_1 \triangleq R_{-\psi} e$$

and $$e_X \triangleq X_d - X,$$

$$e_Y \triangleq Y_d - Y, \quad (1)$$

$$e_\psi \triangleq \psi_d - \psi$$

By using the notation $x \triangleq (V_x, V_y, \dot\psi)^T$ and $X_d \triangleq (V_{x_d}, V_{y_d}, \dot\psi_d)^T$ for the longitudinal, lateral, and yaw velocities respectively of the real vehicle and of the reference vehicle, and by differentiating the error in following the path, the following is obtained:

$$\dot e = R_{\psi d} \dot x_d - R_\psi \dot x \quad (2)$$

By projecting equation (2) into the reference frame [c], the following is obtained:

$$e_2 \triangleq R_{-\psi} \dot e = R_{e_\psi} \dot x_d - \dot x \quad (3)$$

Differentiating $e_1$ and $e_2$ gives respectively $$\Sigma_1 : \dot e_1 = -\dot\psi \wedge e_1 + e_2 \quad (4)$$

$$\Sigma_2 : \dot e_2 = R_{e_\psi}(\dot e_\psi \wedge \dot x_d + \ddot x_d) - \ddot x \quad (5)$$

With:

$$\Delta \triangleq \begin{pmatrix} 0 & -1 & 0 \\ 1 & 0 & 0 \\ 0 & 0 & 0 \end{pmatrix}$$

Figure 3:
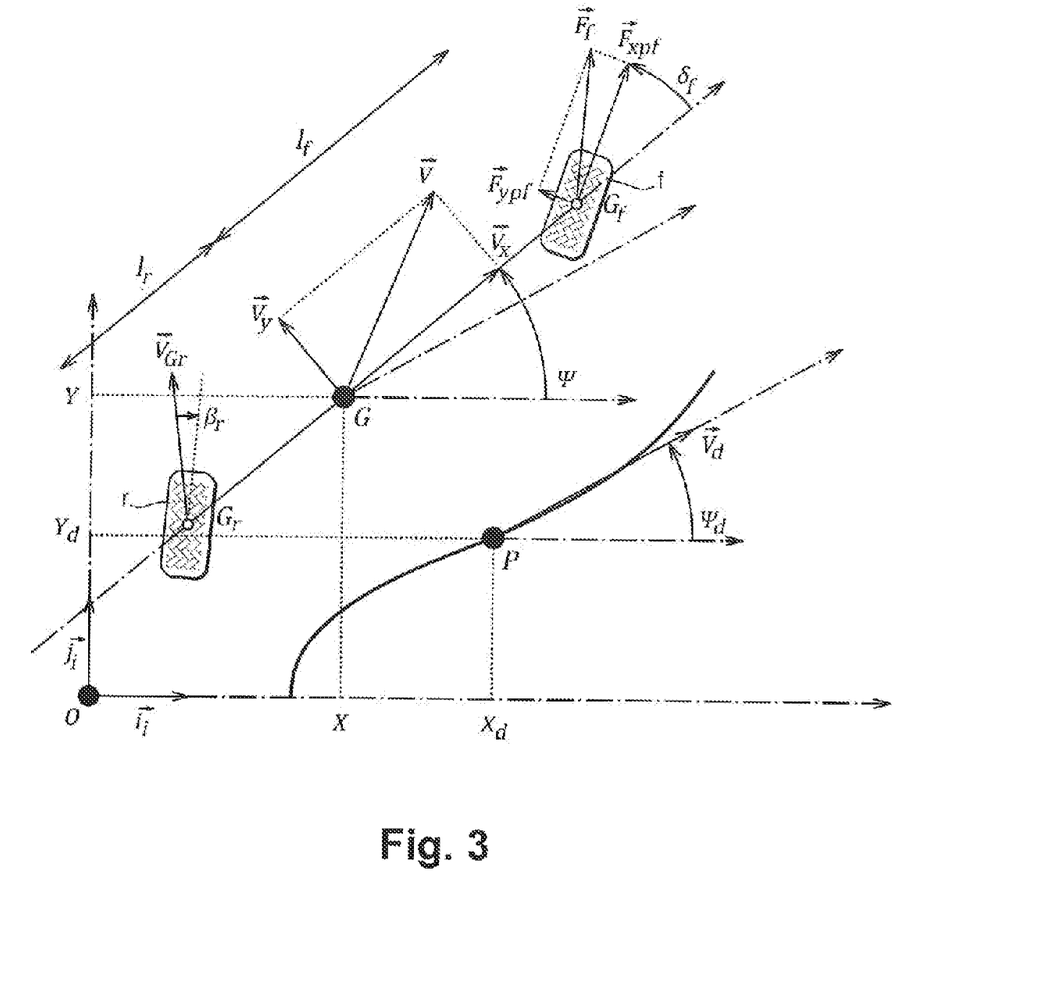
FIG. 3 shows a simplified vehicle moving relative to the ground, its front wheels being grouped together as a single front wheel and its rear wheels being grouped together as a single rear wheel.

It is then necessary to establish a model of the dynamic behavior of the vehicle 1. In order to simplify, the four wheeled vehicle 1 is reduced to a vehicle having two wheels, namely a front wheel f and a rear wheel r (see FIG. 3), and the center of gravity is assumed to be relatively low so as to make it possible to ignore rolling and pitching movements. These simplifications are considered not to harm the modelling of the dynamic behavior of the vehicle by means of the following equations:

$$\begin{cases} m(\dot V_x - V_y \dot\psi) = F_{xf} + F_{xr}, \\ m(\dot V_y - V_x \dot\psi) = F_{yf} + F_{yr}, \\ I_z \ddot\psi = l_f F_{yf} - l_r F_{yr} \end{cases} \quad (6)$$

With:
$F_{xf}$ the longitudinal force of the front wheel;
$F_{xr}$ the longitudinal force of the rear wheel;
$F_{yf}$ the lateral force of the front wheel;
$F_{yr}$ the lateral force of the front wheel; and
Iz the moment of inertia in yaw about the vertical axis, with the other parameters described above.

The forces and the moments in the above equations are expressed as follows in the reference frame [c]:

$$\begin{cases} F_{xf} = F_{xp_f} \cos(\delta_F) - F_{yp_f} \sin(\delta_F), \\ F_{yf} = F_{yp_f} \cos(\delta_F) + F_{xp_f} \sin(\delta_F), \\ F_{xr} = F_{xp_r} \cos(\delta_R) - F_{yp_r} \sin(\delta_R), \\ F_{yr} = F_{yp_r} \cos(\delta_R) + F_{xp_r} \sin(\delta_R). \end{cases} \quad (7)$$

In the reference frames of the tires, the longitudinal forces are defined as follows:

$$\begin{cases} F_{xp_f} = \dfrac{pT_\omega - I_r \dot\omega_f}{r} \\ F_{xp_r} = \dfrac{(1-p)T_\omega - I_r \dot\omega_r}{r} \end{cases} \quad (8)$$

The coefficient p is a coefficient for the distribution of the total torque Tw, which lies in the range 0 (for the torque passing solely via the rear wheels) to 1 (for the torque passing solely via the front wheels) and in this example it is set at 0.5.

By using a linear model for modelling the lateral forces $F_{ypf}$ and $F_{ypr}$ of the front and rear tires for sideslip angles BR, Rr, the following is obtained:

$$\begin{cases} F_{yp_f} \simeq F_{yp_f}^{lin} \triangleq C_{\beta_f} \beta_f = C_{\beta_f}\left(\delta_f - \dfrac{V_y + l_f \dot\psi}{V_x}\right) \\ F_{yp_r} \simeq F_{yp_r}^{lin} \triangleq C_{\beta_r} \beta_r = C_{\beta_r}\left(\delta_r - \dfrac{V_y + l_r \dot\psi}{V_x}\right) \end{cases} \quad (9)$$

By assuming that the steering angles $\delta_r$, $\delta_f$ are relatively small and by injecting the equations (7), (8), (9) into the equations (6), the following is obtained:

$$\dot x = f(x) + g(x)u + h(u) \quad (10)$$

In which:

$$f(x) = \begin{pmatrix} V_y \dot\psi - \dfrac{I_r}{mr}(\dot\omega_f + \dot\omega_r) \\ -V_x \dot\psi - \dfrac{C_{\beta_f}(V_y + l_f \dot\psi) + C_{\beta_r}(V_y + l_r \dot\psi)}{mV_x} \\ -\dfrac{l_f C_{\beta_f}(V_y + l_f \dot\psi) + l_r C_{\beta_r}(V_y - l_r \dot\psi)}{I_z V_x} \end{pmatrix} \quad (11)$$

$$u = \begin{pmatrix} T_\omega \\ \delta_F \\ \delta_R \end{pmatrix}$$

$$h = \begin{pmatrix} -\dfrac{C_{\beta_f}\delta_f^2 + C_{\beta_r}\delta_r^2}{m} \\ \dfrac{p\delta_F T_\omega + (1-p)\delta_R T_\omega}{mr} \\ \dfrac{l_f p T_\omega \delta_F - l_r(1-p)T_\omega \delta_R}{rI_z} \end{pmatrix}$$

$$g(x) = \begin{pmatrix} \dfrac{1}{mr} & \dfrac{C_{\beta_f}(V_y + l_f \dot\psi)}{mV_x} & \dfrac{C_{\beta_r}(V_y - l_r \dot\psi)}{mV_x} \\ 0 & \dfrac{rC_{\beta_f} - I_r \dot\omega_f}{rm} & \dfrac{rC_{\beta_r} - I_r \dot\omega_r}{rm} \\ 0 & \dfrac{l_f(rC_{\beta_f} - I_r \dot\omega_f)}{I_z r} & \dfrac{-l_r(rC_{\beta_r} - I_r \dot\omega_r)}{I_z r} \end{pmatrix}$$

In order to reduce the complexity of the model (10), non-linear terms and the command are ignored so as to obtain:

$$\dot{x}=f(x)+g(x)u \quad (12)$$

Nevertheless, since the object is to control an off-road vehicle, a purely linear model cannot suffice. It is therefore necessary to modify the linear model in order to adapt it to non-linear behavior of the tires: specifically, it is known that as sideslip angles increase, the linear model gives a lateral force $F_{y_p}^{lin}=C_\beta\beta$ that is greater than the real front or rear lateral force $F_{y_p}$, which in this example is in fact the lateral force as estimated from the DUGOFF model. A force $\tilde{F}$ is thus introduced in order to ensure that the assumptions about the linear model being valid remain true, and the following is written:

$$F_{y_p}=F_{y_p}^{lin}+\tilde{F} \quad (13)$$

Since measured values are not available for the real lateral force, recourse is had to estimate, and in this example the following estimate is chosen $F_{y_p}=F_{yij}*$.

For small steering angles, this gives:

$$\begin{cases} F_x = F_{xp} - F_{yp}\delta = F_{xp} - (F_{y_p}^{lin}+\tilde{F})\delta \\ F_y = F_{yp} + F_{xp}\delta = F_{y_p}^{lin} + \tilde{F} + F_{xp}\delta \end{cases} \quad (14)$$

As a result, the set of equations (6) gives:

$$\dot{x}=f(x)+g_1(x)u+\Delta_++\Delta_- \quad (15)$$

With:

$$g_1(x) = g(x) + \Delta_g \quad (16)$$

$$\Delta_g \triangleq \begin{pmatrix} 0 & -\tilde{F}_f & -\tilde{F}_r \\ 0 & 0 & 0 \\ 0 & 0 & 0 \end{pmatrix}$$

$$\Delta_+^T \triangleq \left( 0 \quad \frac{\tilde{F}_f + \tilde{F}_r}{m} \quad 0 \right)$$

$$\Delta_-^T \triangleq \left( 0 \quad 0 \quad \frac{l_f\tilde{F}_f - l_r\tilde{F}_r}{I_z} \right)$$

A solution for solving the problem of a vehicle with four steerable wheels following a path involves using the expression for the dynamic error vector.

The control relationship is constructed by a recursive technique known as "backstepping" and that is based on equations (4) and (5). The control relationship serves to stabilize the error in asymptotic manner.

In order to implement the backstepping technique, the variable $e_2$ in equation (4) is considered to be a control input for regulating $e_1$ on zero. To do this, let:

$$Z_1 \triangleq e_1$$

$$\Sigma_1: \dot{z}_1 = -\dot{\psi}\wedge Z_1 + e_2 \quad (17)$$

In a first step of the backstepping technique, a first candidate Lyapunov function is selected, namely $$V_1(z_1) \triangleq \frac{1}{2}z_1^T z_1,$$

with its derivative being made negative by selecting $e_2=\dot{\psi}\wedge z_1-K_1z_1$ with $K_1$ being a positively defined diagonal matrix. This leads to $\dot{V}_1(z_1)=-z_1^T K_1 z_1$. Since $e_2$ is not the true external control input, the following residue is obtained $$Z_2 \triangleq e_2 e_{2d}$$

with $e_{2d} \triangleq \wedge Z_1-K_1z_1 \quad (18)$

This residue is introduced into equation (17), enabling $\Sigma_1$ to be stabilized. Equation (17) then becomes:

$$\dot{z}_1=-\dot{\psi}\wedge z_1+z_2+e_{2d}=Z_2-K_1z_1$$

While the Lyapunov derivative becomes:

$$\dot{V}_1(z_1) = -z_1^T K_1 z_1 + \frac{1}{2}(z_2^T z_1 + z_1^T z_2)$$

In a second step of the backstepping technique, a candidate Lyapunov function is selected for the dynamic behavior of $Z_2$, namely:

$$V_2 = V_1 + \frac{1}{2}z_2^T z_2$$

The derivative of this function is:

$$\dot{V}_2 = -z_1^T K_1 z_1 + \frac{1}{2}(z_2^T(z_1+\dot{z}_2) + (z_1+\dot{z}_2)^T z_2) \quad (19)$$

This derivative is made negative by selecting $$\dot{z}_2=\dot{e}_2-\dot{e}_{2d}=-z_2-K_2z_2 \quad (20)$$

in which $K_2$ is positive.

The derivative is $\dot{V}_2=-z_1^T K_1 z_1-z_2^T K_2 z_2$, which is less than or equal to 0.

The final command input is the vector u, which appears in the term $\dot{X}$ in equations (12) and (5).

By making equations (20) and (5) equal, the following control relationship is obtained for regulating $e_1$:

$$\begin{cases} u = g^{-1}(-f + R_{e_\psi}(\dot{e}_\psi \wedge x_d + \dot{x}_d) - U), \\ U \triangleq \dot{e}_2 = \dot{e}_{2d} - e_1 - K_2(e_2 - e_{2d}), \\ e_2 = \dot{\psi} \wedge z_1 - K_1 z_1. \end{cases} \quad (21)$$

It can be seen that the control relationship holds if g is invertible. This gives:

$$\det(g) = \quad (22)$$

$$-\left( \frac{l_r(rC_{\beta_f} - I_r\dot{\omega}_f)(rC_{\beta_r} - I_r\dot{\omega}_r)}{m^2 r^3 I_z} + \frac{l_f(rC_{\beta_r} - I_r\dot{\omega}_r)(rC_{\beta_f} - I_r\dot{\omega}_f)}{m^2 r^3 I_z} \right)$$

In which $$\frac{rC_\beta}{I_r}$$

is $10^4$ and is greater than the acceleration of the rotation of the wheel, so $rC_\beta - I_r\dot{\omega}\neq 0$.

The dynamic behavior of the system in a closed loop is as follows:

$$\begin{pmatrix} \dot{z}_1 \\ \dot{z}_2 \end{pmatrix} = \begin{pmatrix} -K_1 & 0 \\ 0 & -K_2 \end{pmatrix} \begin{pmatrix} z_1 \\ z_2 \end{pmatrix} + \begin{pmatrix} 0 & 1 \\ -1 & 0 \end{pmatrix} \begin{pmatrix} z_1 \\ z_2 \end{pmatrix}$$

The control relationship u as formulated in this way takes account only of the linear behavior of the tires.

In order to adapt the control relationship u to the non-linear behavior of the tires, two corrective terms $\Delta_+$ and $L_-$ are added to the other terms of said relationship.

The forces $\tilde{F}_f$ and $\tilde{F}_r$ of equation (16) depend on the steering angles $\delta_f$ and $\delta_r$, which are the command inputs, and the delaying values of $\hat{\Delta}_+$ and $\hat{\Delta}_-$ that are the estimates of $\Delta_+$ and $\Delta_-$ are written $\overline{\Delta}_+$ and $\overline{\Delta}_-$. The following is then obtained:

$$\begin{cases} \overline{\Delta}_+(s) \triangleq e^{-\tau s} F_{LP}(s) \hat{\Delta}_+(s) \\ \overline{\Delta}_-(s) \triangleq e^{-\tau s} F_{LP}(s) \hat{\Delta}_-(s) \\ F_{LP}(s) \triangleq \dfrac{1}{1 + \dfrac{1}{2\pi f_0}} \end{cases} \quad (23)$$

In which s is the Laplace operator, $\tau$ is the delay, $F_{LP}(S)$ is a lowpass filter and $f_0$ is the cut-off frequency of the filter.

It is thus possible to add to the control relationship u (21) the delaying values $\overline{\Delta}_+$ and $\overline{\Delta}_-$ of the estimates of $\Delta_+$ and $\Delta_-$ so that the relationship u takes the following form:

$$\begin{cases} u = g^{-1}\left(-f + R_{e_\psi}(\dot{e}_\psi \wedge x_d + \dot{x}_d) - U - \overline{\Delta}_+ - \overline{\Delta}_-\right), \\ U = \dot{e}_{2d} = e_1 - K_2(e_2 - e_{2d}), \\ e_{2d} = \dot{\psi} \wedge e_1 - K_1 e_1. \end{cases}$$

Thus, the control relationship then has a first portion that is based on a linear model for the behavior of the tires and a corrective second portion that is subtracted from the first portion in order to take account of the non-linear effects in the behavior of the tires. It can be understood that by adapting a control relationship based on a linear model by adding corrective terms that are based on a non-linear model, preparation of the control relationship is simplified. This is applicable to any control relationship based on a linear model.

The terms $\tilde{F}_f$ and $\tilde{F}_r$ in the expression for $\hat{\Delta}_+$ and $\hat{\Delta}_-$ are calculated by the above-described method. An estimate is thus obtained for the maximum lateral friction coefficient $\hat{\mu}_{y_{max}}$ and for the cornering stiffness coefficient $\hat{C}\beta$ for the front and rear tires.

Figure 4:
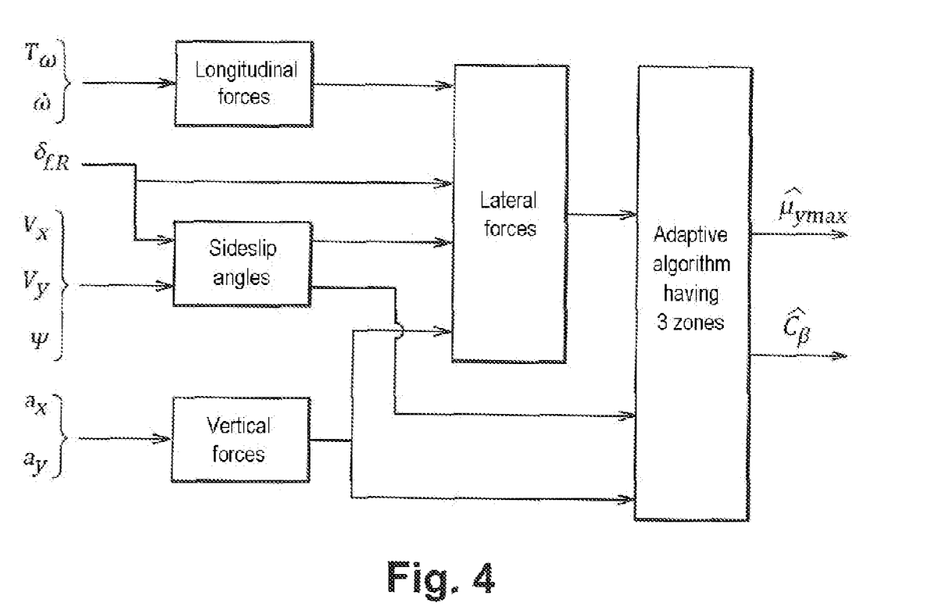
FIG. 4 shows the data needed for estimating the cornering stiffness coefficient and the maximum lateral friction coefficient in an implementation of the invention.

As summarized in FIG. 4, estimation is based on the measurements taken by the inertial unit 7, such as the angular velocity in yaw $\dot{\psi}$, the longitudinal and lateral speeds $V_x$ and $V_y$, and the longitudinal and lateral accelerations $a_x$ and $a_y$. Use is also made of the torque $T_\omega$ and of the steering angles $\delta_f$ and $\delta_r$, which are supplied by the control relationship itself, and also of the angular acceleration of the wheel $\dot{\omega}$. The algorithm takes account of the linear and non-linear portions of the characteristics of the tires by using the adaptive algorithm having three zones. Once the estimates for the maximum lateral friction coefficient $\hat{\mu}_{y_{max}}$ and for the cornering stiffness coefficient $\hat{C}_\beta$ for the front and rear wheels have been obtained, these estimates are used in the DUGOFF model in order to obtain estimates for the lateral force $\hat{F}_{yp}$ such that:

$$\hat{F}_{yp} \triangleq \begin{cases} \hat{C}_\beta \tan(\beta) & \text{if } \lambda \geq 1 \\ \hat{C}_\beta \tan(\beta)(2 - \lambda)\lambda & \text{if } \lambda < 1 \end{cases} \quad (25)$$

With:

$$\lambda = \frac{\mu_{y_{max}} F_z}{2\hat{C}_\beta |\tan(\beta)|}$$

Thus, this gives:

$$\tilde{F} \triangleq \hat{F}_{yp} - \hat{F}_{yp}^{lin}$$

$$\hat{F}_{yp}^{lin} = \hat{C}_\beta \beta \text{ and } \hat{\Delta}_+^T = \begin{pmatrix} 0 & \dfrac{\hat{\tilde{F}}_f + \hat{\tilde{F}}_r}{m} & 0 \end{pmatrix}, \quad (26)$$

$$\hat{\Delta}_-^T \triangleq \begin{pmatrix} 0 & 0 & \dfrac{l_f \hat{\tilde{F}}_f - l_r \hat{\tilde{F}}_r}{I_z} \end{pmatrix}$$

Naturally, the invention is not limited to the implementation described, but covers any variant coming within the field of the invention as defined by the claims.

In particular, the modelling may be used as the basis for a vehicle control relationship, e.g. for controlling the steering of one or more wheels, and/or for controlling the motor means of one or more wheels, and/or for controlling the brakes of one or more wheels, but it may alternatively be used for the purposes of triggering warnings representative of the running conditions of the vehicle.

It is not essential to group the wheels together on a per axle basis.

Some other technique could be used for the control relationship.

It is also possible to calculate the threshold sideslip angle between the linear zone and the non-linear zone as follows:

$$\beta_{th_{ij}}^* = \frac{\mu_{y_{max}} F_{z_{ij}}}{C_{\beta_{ij}}}$$

However, this threshold is greater than the threshold as calculated above.

The vehicle could be different from that described, for example, it could have a different number of wheels.

The invention claimed is:

1. A method of controlling a vehicle having wheels provided with tires resting on a surface, the method using a model of the physical behavior of each tire as a function of a sideslip angle for each tire relative to the surface, the method being characterized in that the model is obtained by defining a theoretical curve for variation of the lateral force exerted by a tire on the surface as a function of its sideslip angle by identifying in the curve a first zone of linear variation, a second zone of linear-to-nonlinear transition, and a third zone of nonlinear variation; and, for each tire, executing the steps of:

acting in real time to define a group of successive lateral force values, each corresponding to a sideslip angle and determining whether said values are varying in accordance with the first zone, the second zone, or the third zone;

applying an affine model when the values are varying in accordance with the first zone;

applying a DUGOFF model when the values are varying in accordance with the second zone; and applying a constant model when the values are varying in accordance with the third zone.

2. The method according to claim 1, wherein the affine model has the form:

$F_{yij}^* = a_1 \beta_{ij} + b_1$ where $F_{yij}^*$ is the value of the lateral force of each tire, $a_1$ is the slope of the curve in the zone and $b_1$ is the intercept.

3. The method according to claim 1, wherein the DUGOFF model has the form:

$F_{yij}^* = F_{yij\,dug}$ where:

$F_{yij}^*$ is the lateral force of each tire;

$$F_{yij\,dug} = \begin{cases} C_{\beta_{ij}} \tan(\beta_{ij}) & \text{if } \lambda \geq 1 \\ C_{\beta_{ij}} \tan(\beta_{ij})(2-\lambda)\lambda & \text{if } \lambda < 1 \end{cases};$$

$$\lambda = \frac{\mu_{y_{ij}max} F_{Z_{ij}}}{2 C_{\beta_{ij}} |\tan(\beta_{ij})|};$$

$C_{\beta ij}$ is the cornering stiffness coefficient of each tire;

$\mu_{ymaxij}$ is the maximum lateral friction coefficient of each tire; and $\beta_{ij}$ is the sideslip angle of each tire.

4. The method according to claim 1, wherein the constant model has the form:

$F_{yij}^* = b_2$ where $F_{yij}^*$ is the lateral force of each tire and $b_2$ is the maximum lateral force in the third zone.

5. The method according to claim 1, wherein application of each of the models consists in finding the cornering stiffness coefficient and the maximum lateral friction coefficient for each tire that minimizes the difference between the lateral force values obtained for each tire with each model and the values of the group of values.

6. The method according to claim 5, wherein application of the affine model implements the least squares method.

7. The method according to claim 5, wherein application of the DUGOFF model includes implementing a Levenberg Marquardt optimization algorithm.

8. The method according to claim 1, wherein the group of lateral force values is modified by adding a value if:

the difference between the most recent sideslip angle of the group and the current sideslip angle $\beta(k+1)$ is greater than a first angle threshold ($\epsilon_1$); and/or no value has been added or a length of time longer than a first time threshold (i).

9. The method according to claim 1, wherein the group of lateral force values is modified by subtracting a value if:

the difference between the first sideslip angle of the group values and the last sideslip angle $\beta(k)$ of the group of values is greater than a second angle threshold ($\epsilon_2$), then the first value is deleted;

a value has been in the window for a length of time longer than a second time threshold then the first value is deleted; and/or the group has a number of values that is greater than a predetermined threshold number, then at least one value is deleted and preferably every other value is deleted.

10. The method according to claim 1, wherein the model for application is determined by calculating the slope of the curve and by applying the values of the group of the affine model, with the transition from one zone to another being determined as a function of the values of the slope and of the ordinate.

* * * * *